June 23, 1931.  J. J. CONWAY  1,811,494
FENDER PROTECTOR
Filed Jan. 19, 1931  2 Sheets-Sheet 1

Inventor
John J. Conway
By Wooster & Davis
Attorneys.

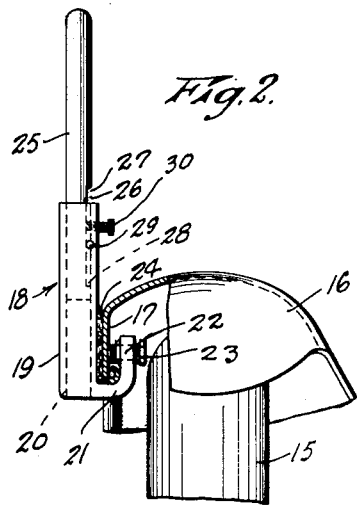
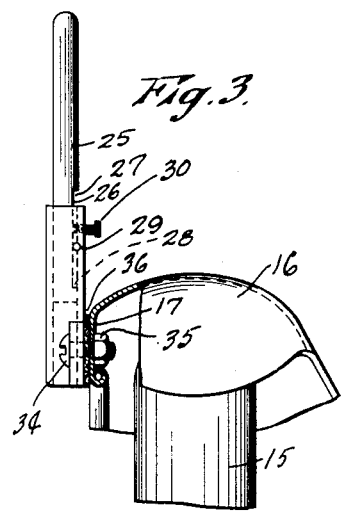
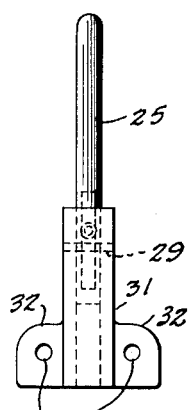
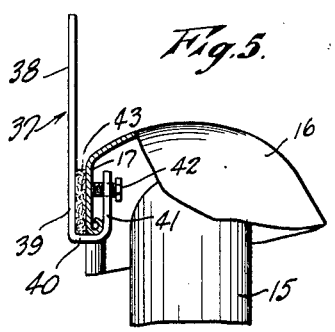
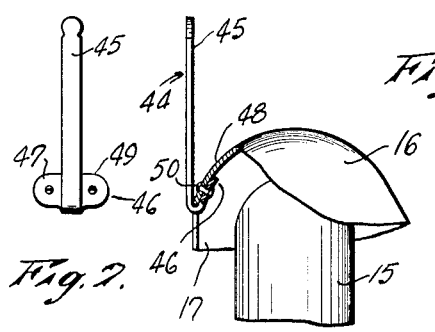
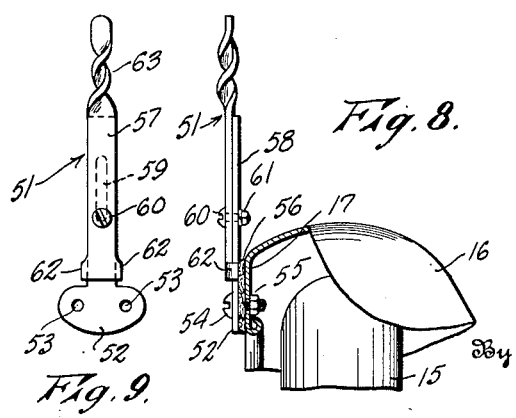

Patented June 23, 1931

1,811,494

UNITED STATES PATENT OFFICE

JOHN J. CONWAY, OF BRIDGEPORT, CONNECTICUT, ASSIGNOR TO THE ACME SHEAR COMPANY, OF BRIDGEPORT, CONNECTICUT, A CORPORATION OF CONNECTICUT

FENDER PROTECTOR

Application filed January 19, 1931. Serial No. 509,771.

This invention relates to new and useful improvements in automobile accessories and comprises a fender protector adapted to be secured to the outer edge of and project above the front right fender of an automobile in a position to be easily visible from the driver's seat whereby the relationship of the fender to an object at the right side of the car may be readily determined.

At the present time owing to the fact that automobiles are manufactured with relatively high hoods and low fenders and that the steering wheel is placed at the left side of the car, it is difficult or impossible for a driver from his position behind a steering wheel to see his right front fender or mudgard. This at times occasions considerable difficulty in parking or in driving into and out of garages or other places where the space is limited and not infrequently brings about accidents resulting in damage to the fender. Since the driver is not sure as to the exact location of his right front fender he is never certain as to the distance between said fender and a parked car or the door post of a garage or the like.

It is an object of the invention to provide a protector or indicator whereby the driver of a car may readily see the location of his right front fender and thus avoid damaging his car or garage or other property or the car or property of someone else.

A further object is to provide a device for the purpose stated and which is simple and rugged in construction and which will not get out of order or be adversely affected by inclement weather and which may be provided for ready attachment to or detachment from a car, or which may be permanently secured in place as by bolts, rivets or the like.

Another object is to provide a device for the purpose and having the characteristics stated and which comprises a body or attaching portion and a portion vertically adjustable on the attaching portion and which may include means to prevent unauthorized removal of the adjustable portion.

Additional objects and advantages will become apparent from a consideration of the following detailed description taken in connection with the accompanying drawings wherein satisfactory embodiments of the invention are shown. It is, of course, to be understood that the invention is not limited to the details shown but includes all such variations and modifications as fall within the spirit of the invention and the scope of the appended claims.

In the drawings:

Fig. 2 is a view partly in front elevation and partly in section showing a portion of an automobile tire and fender with a form of fender protector in place on the fender;

Fig. 3 is a view similar to Fig. 2 but showing a slightly modified construction of protector;

Fig. 4 is a view looking from the left in Fig. 3 and showing the protector alone;

Fig. 5 is a view similar to Fig. 1 but showing a modified form of protector;

Fig. 6 is a similar view showing a further modification wherein the protector is riveted to the fender;

Fig. 7 is a view of the protector of Fig. 6 detached;

Fig. 8 is a view similar to Fig. 1 but showing a further modification; and

Fig. 9 is a view of the protector of Fig. 8 detached.

Figure 1:
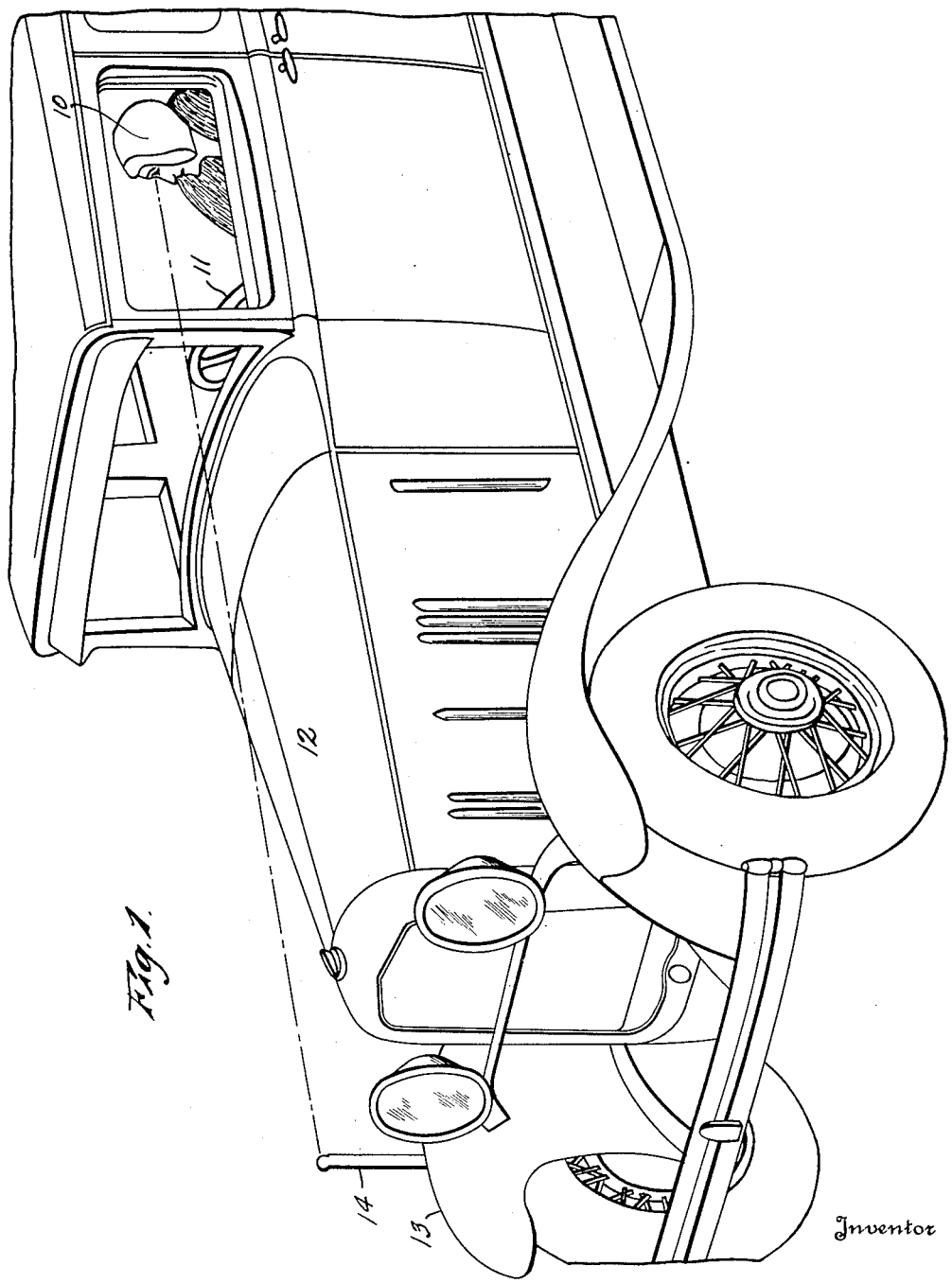
Fig. 1 is a perspective view of the front portion of an automobile showing one form of fender protector on the right fender thereof.

Referring in detail to the drawings, Fig. 1 illustrates the application of the invention to an automobile, this figure showing the location of the fender protector on a car and the figure will also serve to illustrate the function of the device. In Fig. 1 the driver of the car is indicated at 10 in position behind the steering wheel 11 the hood of the car being indicated at 12 and the right fender at 13. Owing to the height of the hood 12 relative to the fenders the driver from his normal position in the rear of the steering wheel 11 cannot see the fender 13. However, to the outer edge of the fender 13 I propose to attach a protector or indicator shown at 14, of such height as to be easily visible by the driver from position behind the steering wheel.

With this arrangement the driver will always be able to determine the location of his fender relative to an object at the right hand side of the car. Thus, when backing into a restricted parking space or when driving by parked cars or other objects the driver can easily estimate the distance between his right fender and the parked cars or other objects and there will be little if any likelihood of an accident occuring due to a driver's ignorance of the exact location of his fender.

Turning to Fig. 2 a portion of an automobile tire is shown at 15 in the relationship it would bear to a fender, a portion of which is shown at 16. The fender 16 includes an outer flange or wall 17 to which is secured a protector 18. Protector 18 includes a body or base or attaching portion or member 19 which is preferably tubular and which may be cast or otherwise formed, being provided with a longitudinally extending opening 20.

The base or body 19 includes an arm or bracket 21 which may be formed integral therewith as shown and this bracket includes a portion 22 arranged in spaced relation to the base and extending substantially parallel thereto. The wall 17 of the fender is adapted to be received between the base 19 and the arm 22 and the arm includes or carries a set screw 23 whereby to clamp or secure the protector to the fender. To take care of variations in the fender and also to protect the fender and prevent rattling a piece of felt 24 may be inserted between the base 19 and the outer surface of the wall 17 of the fender.

Disposed within the opening 20 in the base and vertically adjustable therein is an extension or indicator member 25. Member 25 has a portion cut away as at 26 to provide shoulders 27 and 28 adapted to co-operate with a pin 29 carried by and extending through the base. Shoulders 27 and 28 limit the movement of the extension 25 relative to the base and shoulder 28 prevents the unauthorized withdrawal of the extension from the base. This last is true since when the shoulder is brought into engagement with the pin 29 further upward movement of the extension is prevented. A screw 30 is carried by the body or attaching member 19 and this screw is used to secure the extension 25 in desired adjusted position.

From the foregoing it will be obvious that this fender protector as disclosed in Fig. 2 is in the nature of an attachment which may be easily applied and removed, it simply being necessary to operate the screw 23 for the purpose of securing the protector in place on the fender. Further, it will be apparent that the projection 25 may be adjusted to the desired height or to the point where it may be easily seen across the hood from a position in the rear of the steering wheel and may then be secured at the height desired by tightening the screw 30.

Figs. 3 and 4 show a protector quite similar to that shown in Fig. 2 the only difference being in the means whereby the protector is secured to the fender. In these figures the protector is more permanently attached, the base or fastening portion 31, the equivalent of the portion 19 of the device shown in Fig. 2, being provided at each of its sides with an ear or lug 32 perforated as at 33 for the reception of bolts or other fastening means. To secure this form of protector to a fender it is first necessary to provide openings in the fender spaced apart the distance which the perforations of the lugs or ears 32 are spaced apart. The bolts indicated at 34 may then be threaded or passed through the openings 33 and then through the openings in the fenders. To secure the bolts nuts 35 are provided, and to protect the fenders and to prevent rattling felt 36 may be interposed between the base 31 and the fender. The remainder of the structure shown in Figs. 3 and 4 is identical with that shown in Fig. 2 and a further description is, therefore, believed unnecessary.

In Fig. 5 a further modified form of protector is shown, the protector of this figure being generally designated 37. This protector 37 is preferably formed of a single piece of metal comprising an indicating portion 38 and a body or attaching portion 39. The attaching portion is preferably substantially U-shaped and is adapted to receive the wall 17 of the fender.

To provide this attaching portion or body the member 37 is bent upon itself as at 40 to provide an arm 41 adapted to be disposed at the inner side of the fender and carrying a screw 42 similar to and for the same purpose as the screw 23 of Fig. 2. Also, there may be interposed between the outer surface of the fender wall 17 and the indicator or protector a layer of felt 43 whereby to take care of variations in fenders and to prevent rattling. It will be seen that while the protector 37 is not adjustable it is of extremely simple construction and may, therefore, be easily and cheaply made.

Figs. 6 and 7 show a further modification wherein the protector generally designated 44 is formed of a single piece of metal including an indicator portion 45 and a body or attaching portion 46. The fender 47 is shown in this figure slightly different in construction from that shown in the other figures but it includes an outer wall 48 to which the protector 44 is to be secured. Attaching portion 46 of the protector includes ears 49 arranged to project laterally of the protector and perforated to receive rivets or bolts 50 whereby the projector is more or less permanently secured to the fender.

As in the case of the protector of Fig. 5, the protector of Figs. 6 and 7 is not adjustable but being formed of a single piece of material may be easily and cheaply manufactured. Also, it will be understood that when these protectors are made for particular cars they may well be made a definite height whereby when they are attached to the fender of the car for which they are made they will be readily visible from the driver's seat of said cars.

Figs. 8 and 9 also disclose a modified structure adapted to be more or less permanently secured to a wall 17 of a fender 16, and as disclosed in these figures the protector 51 includes an attaching portion or body 52 having openings 53 for the passage of bolts 54. These bolts 54 are passed through the openings 53 and then through openings in the wall 17 of the fender. To secure the bolts nuts 55 are provided and if desired a layer of felt 56 may be inserted between the base or body 52 and the fender.

Vertically adjustable on the attaching portion or body 52 is an indicating portion 57. As shown the portion 52 includes a vertically extending strap 58 and this strap is provided with an elongated slot 59 through which extends a bolt 60 carried by the portion 57. A nut 61 on the bolt 60 is adapted to be tightened to clamp the portions 57 and 58 together with the portion 57 in the desired adjusted position. To prevent turning movement of the portion 57 about the bolt 60 as a pivot, the portion 57 may be provided with lugs 62 to embrace the side edges of the portion 58.

It will be seen that both the attaching portion and the indicating portion of the protector 51 of Figs. 8 and 9 may be made of strap material and thus easily and cheaply constructed. If desired the upper end portion of the signalling or indicating portion 57 may be twisted or given a turn as suggested at 63.

From the foregoing description it will be apparent that I have provided a fender protector or a means for indicating to a driver the exact location of the right front fender whereby he may always accurately gauge the distance between his car and another car or object. Also, it will be apparent from the drawings and description that the device may be made in a variety of ways and may be made as an attachment to be applied to a fender without drilling the same or may be made to be permanently secured to the fender as by bolts or rivets or the like. Additionally, it will be seen that the improved device is of rugged construction and does not include any delicate parts which may become worn or clogged or otherwise damaged so as to interfere with the device performing the functions for which it is designed.

Having thus set forth the nature of my invention, what I claim is:

1. A fender protector comprising a body, means for securing said body to a fender, upright indicating means adjustable vertically through said body, means to hold said indicating means in adjusted position, and means to prevent withdrawal of the adjustable indicating means from the body.

2. In a fender protector, an attaching portion and an upright indicating portion, means to secure said attaching portion to a fender, said attaching portion having a longitudinally extending opening therein, said indicating portion adjustable vertically in said opening in the attaching portion, and means carried by one of said portions for securing the indicating portion in desired adjusted position.

3. A fender protector comprising a hollow body, means for securing said body to a fender, an upright indicating means adjustable vertically through said body, means to hold said means in adjusted position, said vertically adjustable means cut away intermediate its ends and within the body to provide spaced shoulders, and a pin carried by the body and extending into the cut-away portion of the vertically adjustable means whereby movement of said means is limited by the contact of its shoulders with the pin.

In testimony whereof I affix my signature.

JOHN J. CONWAY.